United States Patent [19]

Howerton

[11] 4,215,589

[45] Aug. 5, 1980

[54] SELF ORIENTING POWER TRANSMISSION BELT

[75] Inventor: Anderson W. Howerton, Nixa, Mo.

[73] Assignee: Dayco Corporation, Dayton, Ohio

[21] Appl. No.: 929,608

[22] Filed: Jul. 31, 1978

[51] Int. Cl.$^2$ .............................................. G01F 1/06
[52] U.S. Cl. ..................................... 474/62; 474/259; 474/271
[58] Field of Search ................... 74/231 R, 238, 237, 74/242.1 A, 233, 234

[56] References Cited

U.S. PATENT DOCUMENTS

| 2,347,798 | 5/1944 | Reiling | 74/233 |
| 3,774,464 | 11/1973 | McCanse et al. | 74/242.1 |

Primary Examiner—Werner H. Schroeder
Assistant Examiner—Doris L. Troutman
Attorney, Agent, or Firm—Reuben Wolk; Charles E. Bricker

[57] ABSTRACT

A self orienting power transmission belt is provided which has a round cross-section and a triangular core. The belt is constructed by wrapping a rubberized fabric about a triangular core comprising a plurality of longitudinally extending load-carrying members embedded in a rubber compound, and curing the resulting wrapped core in a curing mold having a round cross-section. This belt is particularly useful in a multi-planar drive system.

14 Claims, 9 Drawing Figures

U.S. Patent      Aug. 5, 1980      4,215,589
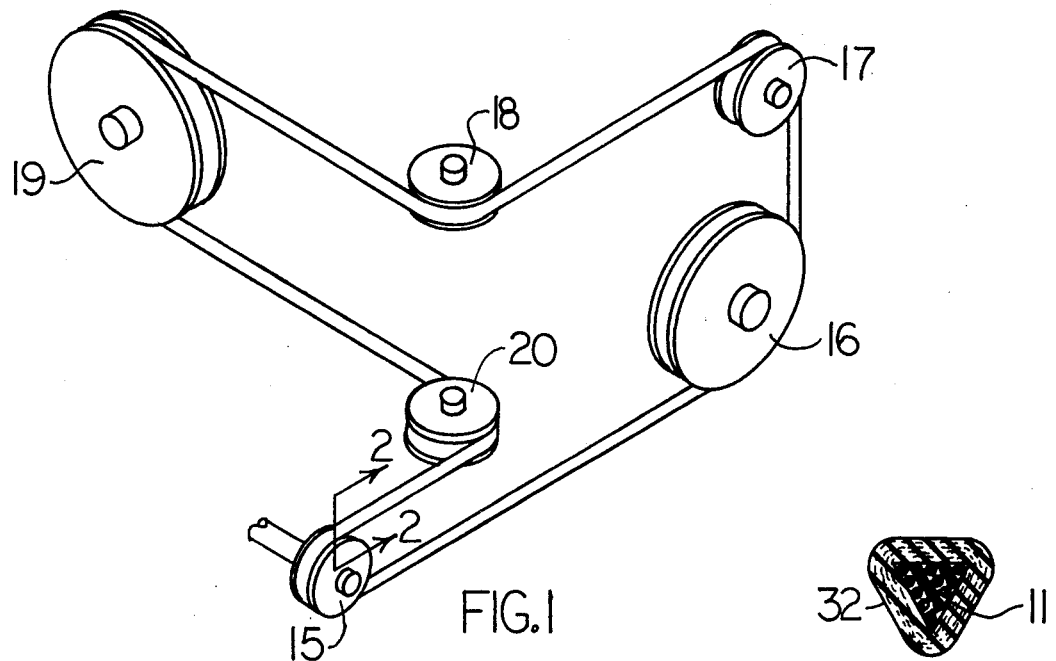
FIG.1
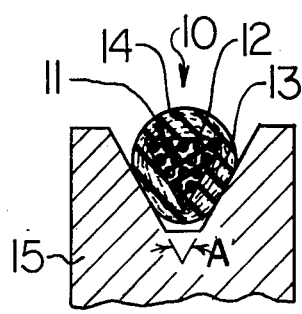
FIG.2
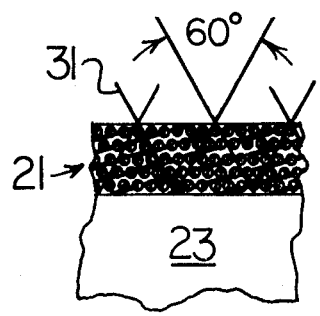
FIG.3
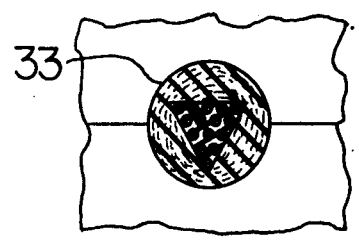
FIG.8
FIG.9
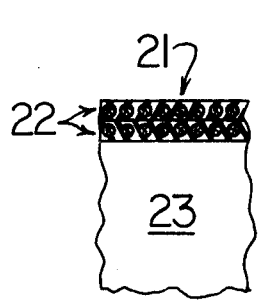
FIG.4
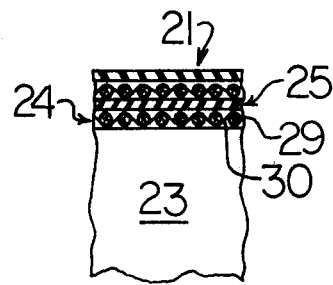
FIG.5
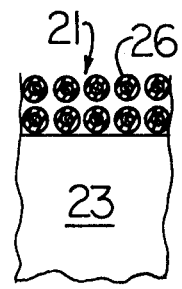
FIG.6
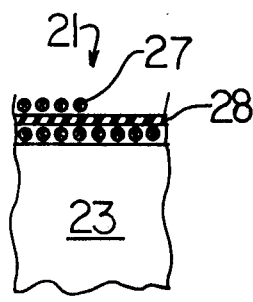
FIG.7

SELF ORIENTING POWER TRANSMISSION BELT

BACKGROUND OF THE INVENTION

This invention relates to improvements in power transmission belts. In one aspect this invention relates to an improved power transmission belt. In another aspect it relates to a method for making an improved power transmission belt. In yet another aspect, this invention relates to an improved power transmission system.

Belt-driven power transmission systems are widely used. In general such systems are coplanar, i.e., the driving and driven pulley sheaves are arranged in a single plane. Power transmission systems wherein the pulley sheaves are not coplanar are also known. For example, the system disclosed in U.S. Pat. No. 3,774,464 comprises an upright drive pulley, a pair of spaced, upright mule guide pulleys, a plurality of spaced, coplanar, driven pulleys mounted for rotation about upright axes, and a single, continuous belt trained around the pulleys and having a single arc of contact with each pulley. Although not specified, this belt appears in the drawings to be of the V-type.

The power transmitting advantages of a V-belt as compared with flat belts and round belts are well known in the art. A V-belt wedges into a pulley groove and can transmit power even under conditions where a flat or round belt might not.

As noted previously, V-belts are generally used in coplanar drive systems. When used in multi-planar systems, such as that disclosed in U.S. Pat. No. 3,774,464, the belt must be twisted to assure that the belt will be properly positioned in the various pulley grooves. During operation, particularly high speed operation, should the belt enter the pulley at the wrong attitude, the belt will either fail to properly transmit power, or will flip off of the pulley.

A solution to the problem of belt slippage is provided by U.S. Pat. No. 2,347,798 which discloses a drive belt having a plurality of working surfaces, any pair of which can be used for transmitting power employing the wedging action normally associated with a V-belt. This belt preferably has an equilateral triangular cross-sectional shape, and comprises an equilateral triangular cord of relatively inextensible cords embedded in rubber, and superimposed rubberized fabric layers applied around the cord. This triangular belt is superior to a V-type belt in that a plurality of working surfaces are available rather than the two working surfaces of a V-type belt. However, the triangular belt is prone to flipping off of a pulley, just as is a V-type belt, if it enters a pulley at the wrong attitude.

The triangular belt disclosed in U.S. Pat. No. 2,347,798 is also superior to a round belt, since a round belt does not provide the wedging action required to prevent slipping of the belt during use. A round belt, however, has no attitude at which it must enter a pulley groove. What is desired, therefore, is an endless power transmission belt which combines the wedging action of a V-type or polygon shaped belt with the reduced tendency to flip out of a pulley groove of a round belt.

It is therefore an object of the present invention to provide an improved endless power transmission belt which provides the advantages of a V-type belt combined with the advantages of a round belt.

It is another object of the present invention to provide a method for producing an improved endless power transmission belt.

It is a further object of the present invention to provide an improved multi-planar power transmission system.

Other objects, aspects and advantages of the present invention will be apparent to those skilled in the art from the following description taken with the attached drawings.

SUMMARY OF THE INVENTION

In accordance with the present invention there is provided an endless power transmission belt having a round cross-section and a triangular core. The core comprises a plurality of load-carrying cords embedded in a rubber composition. The triangular core is surrounded by a plurality of layers of rubber and fabric molded to provide an overall round cross-section. The method of making this belt is described hereinafter.

Also provided in accordance with the present invention is a power transmission system comprising a plurality of pulley sheaves arranged in different planes, and an endless power transmission belt, as described above, passed over the sheaves.

BRIEF DESCRIPTION OF THE DRAWING

In the drawing:

FIG. 1 illustrates the arrangement of the improved belt of this invention for transmitting power through pulley sheaves located in different planes normal to the longitudinal axis of the belt;

FIG. 2 is a sectional view taken on the line 2—2 of FIG. 1;

FIG. 3 is a sectional view showing the step cutting the core of the improved belt of this invention;

FIGS. 4–7 are sectional views showing methods of building up the belt core sleeve;

FIG. 8 is a sectional view showing the step of wrapping rubberized fabric around the triangular core; and FIG. 9 is a sectional view showing the step of molding the belt to its final shape.

DETAILED DESCRIPTION OF THE INVENTION

Referring now to the drawing, as shown in FIG. 2, the belt of this invention comprises a round wrapped belt 10 having a central triangular strength section or core 11. The core 11 comprises a plurality of load-carrying cords 12 embedded in a rubber composition 13. The triangular core 11 is surrounded by a plurality of layers 14 of rubber and fabric molded to provide a resulting round cross-section.

The use of the belt of this invention for driving pulley sheaves in different planes is illustrated in FIG. 1. A power source, not shown, drives the attached pulley sheave 15, around which is passed the round belt 10 which is passed over the pulley sheaves 16, 17, 18, 19 and 20, the belt 10 having but a single arc of contact with each face of each of the pulley sheaves 15–20. The term "arc of contact" may be defined as the arc through which the belt contacts each face of the pulley sheave. During operation of the belt 10 around the pulley sheaves 15–20, the belt 10 is self-orienting, that is, the belt 10 can roll to the correct attitude in the pulley groove. This attitude is shown in FIG. 2 wherein one apex of the triangular core 11 extends toward the center of the pulley 15. If during operation of the belt in the different planes shown in FIG. 1, the belt 10 turns and enters one of the pulley sheaves at an attitude different from the attitude shown in FIG. 2, the belt will tend to roll so as to have the attitude shown.

Referring again to FIG. 2, the pulley sheave has an included angle A in the approximate range of 50° to 60°, preferably about 57° to 59°, and more preferably 58°. This included angle provides for a wedging action of pulley sheave 15.

The belt 10 is constructed by first building up a core sleeve 21, as shown in FIG. 3. The sleeve 21 can be built up, as shown in FIG. 4, by sequentially wrapping a plurality of layers 22 of tire cord fabric having a rubber compound calendered to at least one side thereof about a circular mandrel 23. The sleeve 21 can be built up, as shown in FIG. 5, by wrapping alternating layers of tire cord fabric 24 and thin calendered rubber 25 around the mandrel 23. The sleeve 21 can be further built up by winding individual strands of load-carrying cord, either using rubbercoated cord 26, as shown in FIG. 6, or cord 27 with intervening layers 28 or rubber, as shown in FIG. 7, around the mandrel 23.

The "tire cord fabric" referred to above comprises a plurality of parallel strength members laid in the warp direction and a plurality of comparatively weak tie strands which are arranged in spaced substantially parallel relation in the weft direction and which hold the strength members substantially parallel. Referring again to FIG. 5, these strength members are designated generally by the reference numeral 29 and the tie strands are designated generally by the reference numeral 30.

Regardless of the method used, the sleeve 21 is built up to a desired thickness and then cured to a desired state of cure, which is at least sufficient that the cores 11 cut therefrom will hold a desired shape during the later manufacturing steps. During the curing step, the rubber flows together to surround and embed the strength cords. Following the curing step, the sleeve 21, still mounted on the mandrel 23, is cut along the lines 31 to provide at least one core 11 having an equilateral triangular cross-section.

The core 11, which is at least partially cured, is wrapped with at least two layers 32 of rubberized fabric, as shown in FIG. 8. In a presently preferred embodiment, the core 11 is wrapped with at least four layers 32 of rubberized fabric. The wrapped core is then placed in a circular-shaped mold 33, as shown in FIG. 9, and cured to provide a finished belt.

The cords 12 can be any cord known in the art and having an elongation at break in the approximate range of 110 to 116 percent, preferably 112 to 114 percent. Suitable cord materials include polyester, nylon and the like. Such extensible cord is required when the cord at the apex of the triangular cord is carrying maximum stress. If this cord were substantially inextensible, the cord could break under peak stresses, ultimately resulting in failure of the belts.

The term "rubber" as used herein and in the claims is intended to include any suitable elastomeric material.

Reasonable modifications are possible within the scope of this disclosure without departing from the scope and spirit thereof.

I claim:

1. An endless power transmission belt having a round cross-section and a triangular core, said core comprising a plurality of longitudinally extending load-carrying cords embedded in a rubber compound.

2. The belt of claim 1 wherein said core is an equilateral triangle.

3. The belt of claim 1 wherein said load-carrying cords have an elongation at break in the approximate range of 110 to 116 percent.

4. The belt of claim 1 comprising said triangular core and a plurality of layers of rubberized fabric wrapped therearound.

5. The belt of claim 1 wherein said load-carrying cords comprise a tire cord fabric.

6. The belt of claim 1 wherein said load-carrying cords are individual strands.

7. A drive system comprising a plurality of pulley sheaves arranged in different planes, wherein one of said pulley sheaves is a driving sheave and the remainder of said pulley sheaves are driven sheaves, said sheaves having a V-shaped working surface, and a single continuous belt trained around said sheaves and having a single arc of contact with each face of each sheave respectively, said belt having a round cross-section and a triangular core, said belt core comprising a plurality of longitudinally extending load-carrying cords embedded in a rubber compound.

8. The drive system of claim 7 wherein said belt core is an equilateral triangle.

9. The drive system of claim 7 wherein said belt core comprises a plurality of longitudinally extending load-carrying members embedded in a rubber compound.

10. The drive system of claim 7 wherein said load-carrying cords have an elongation at break in the approximate range of 110 to 116 percent.

11. The drive system of claim 7 wherein said belt comprises said triangular core and a plurality of layers of rubberized fabric wrapped therearound.

12. The drive system of claim 7 wherein said pulley sheaves have an included angle in the approximate range of 50° to 60°.

13. The drive system of claim 7 wherein said pulley sheaves have an included angle in the range of 57° to 59°.

14. The drive system of claim 7 wherein said pulley sheaves have an included angle of 58°.

* * * * *